United States Patent

Jones

[15] 3,637,014
[45] Jan. 25, 1972

[54] SECONDARY OIL RECOVERY PROCESS USING TIME-DEPENDENT SHEAR-THINNING LIQUID

[72] Inventor: Lloyd G. Jones, Dallas, Tex.
[73] Assignee: Mobil Oil Corporation
[22] Filed: Mar. 2, 1970
[21] Appl. No.: 15,553

[52] U.S. Cl. ............................................. 166/273, 166/275
[51] Int. Cl. ......................................................... E21b 43/22
[58] Field of Search ................................. 166/268, 273–275, 166/306; 252/8.55 A, 8.55 D

[56] References Cited

UNITED STATES PATENTS

| | | | |
|---|---|---|---|
| 3,279,537 | 10/1966 | Kirk et al. | 166/275 X |
| 3,292,696 | 12/1966 | Sandiford | 166/273 |
| 3,391,736 | 7/1968 | Abdo | 166/275 |
| 3,502,146 | 3/1970 | Hurd | 166/273 X |
| 3,519,077 | 7/1970 | Odeh | 166/275 X |
| 3,523,581 | 8/1970 | Murphy | 166/273 |

*Primary Examiner*—Ian A. Calvert
*Attorney*—William J. Scherback, Frederick E. Dumoulin, William D. Jackson, Andrew L. Gaboriault and Sidney A. Johnson

[57] ABSTRACT

Secondary oil recovery process in which at least a portion of the driving fluid injected into the oil reservoir is a time-dependent shear-thinning liquid. The time-dependent liquid retains a relatively low viscosity induced by the shear rates encountered during injection and thereafter undergoes an increase in viscosity with time. As the viscosity of the time-dependent liquid increases, it functions to increase the sweep efficiency of the secondary recovery process.

6 Claims, 5 Drawing Figures

PATENTED JAN 25 1972  3,637,014
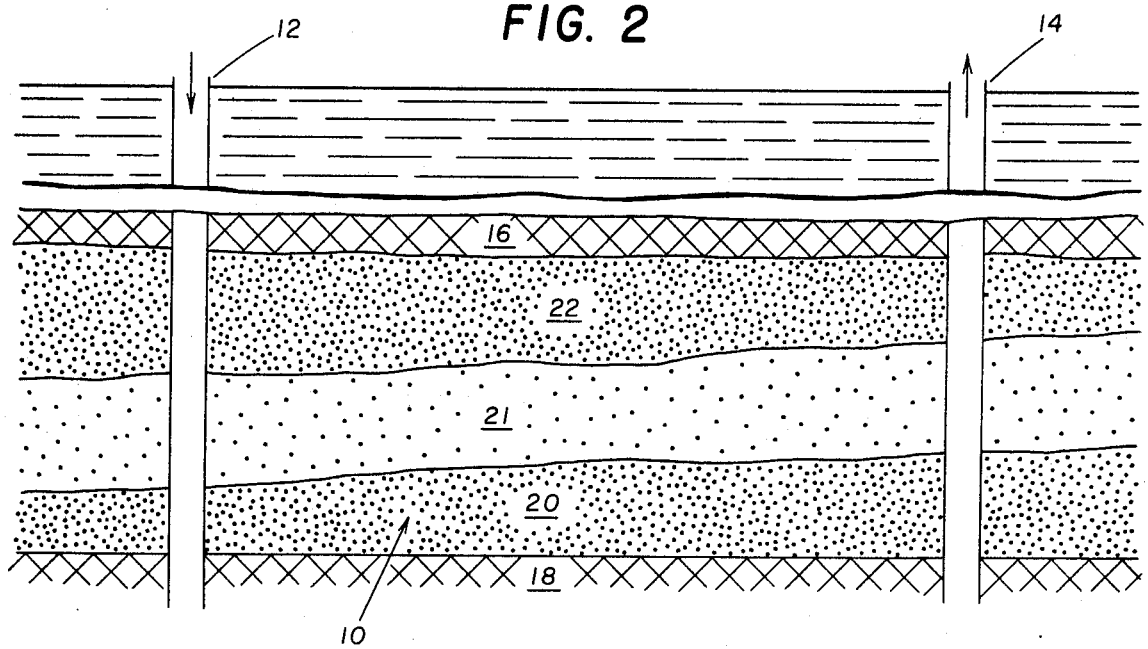
FIG. 2
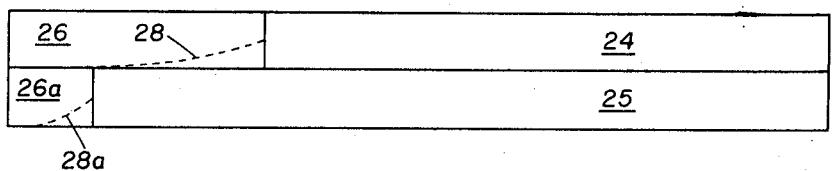
FIG. 3A
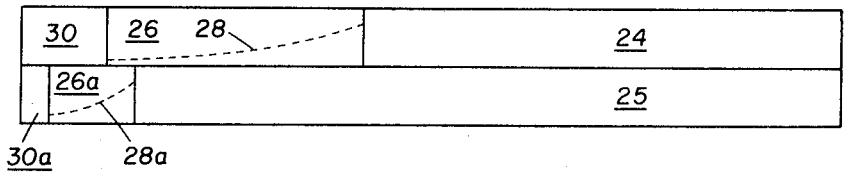
FIG. 3B
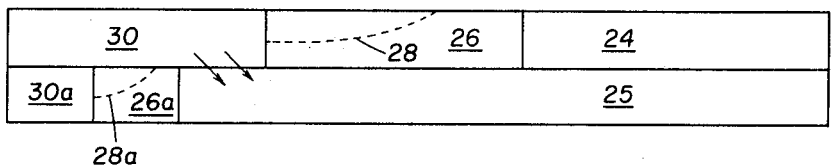
FIG. 3C
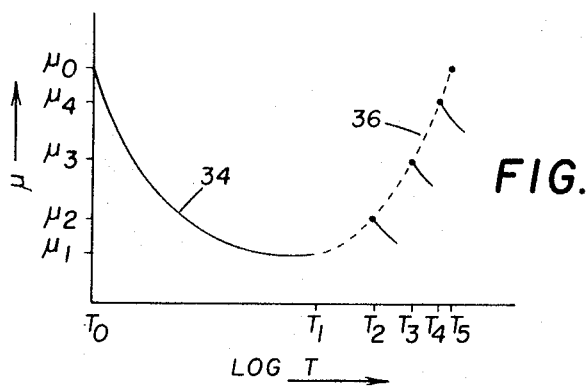
FIG. 1
LLOYD G. JONES
INVENTOR
ATTORNEY No. 3,637,014

SECONDARY OIL RECOVERY PROCESS USING TIME-DEPENDENT SHEAR-THINNING LIQUID

BACKGROUND OF THE INVENTION

This invention relates to the recovery of oil from subterranean oil reservoirs and more particularly to new and improved secondary recovery processes which employ a time-dependent shear-thinning liquid.

In the recovery of oil from oil-bearing formations, it usually is possible to recover only a minor portion of the original oil in place by the so-called primary recovery methods which utilize only the natural forces present in the reservoir. Thus, a variety of supplemental recovery techniques have been employed in order to increase the recovery of oil from subterranean reservoirs. In these supplemental techniques which are commonly referred to as "secondary recovery operations," although in fact they may be primary or tertiary in sequence of employment, fluid is introduced into the reservoir in order to displace the oil therein to a suitable production system through which the oil may be withdrawn to the surface of the earth. Generally, the most promising of the secondary recovery techniques are the waterflooding processes which involve the injection of an aqueous flooding medium such as fresh water or brine. The aqueous flooding may be injected either alone or in combination with other fluids such as a gas, an oil-miscible liquid such as butane, or an oil and water-miscible liquid such as an alcohol. Other commonly employed secondary recovery processes include gas drives, miscible floods, and thermal recovery techniques. In thermal recovery, heated fluids such as steam or hot combustion products may be injected, or a combustion supporting gas may be employed to support in situ combustion.

One difficulty which often is encountered in secondary recovery operations is the relatively poor sweep efficiency of the injected driving fluid, that is, the tendency of this fluid to channel through certain portions of the reservoir and to bypass other portions. Such poor sweep efficiency is occasioned by differences between the viscosity of the injected fluid and the in situ reservoir oil and also by permeability variations within the reservoir. The reservoir may comprise a plurality of fairly well defined zones of widely diverse permeabilities. The injected fluid preferentially flows through the more permeable zones of the reservoir thus leading to premature breakthrough of the driving fluid at the production well or wells.

Even when the reservoir exhibits a relatively uniform permeability throughout, a situation referred to as instability fingering may develop in those instances where the viscosity of the injected fluid is significantly less than the viscosity of the in situ reservoir oil. In this situation, the less viscous fluid tends to develop fingers or bulges which may be caused by points of minute heterogeneities in the reservoir. These fingers of displacing fluid tend to become extended in the direction of flow and travel at a faster rate than the remainder of the injected fluid, thus again resulting in premature breakthrough at the production system.

Various techniques have been proposed in order to improve the sweep efficiency of an injected displacing fluid and thus avoid premature breakthrough. For example, U.S. Pat. No. 3,051,234 to Kyte discloses a waterflooding process in which clay is added to the floodwater as a viscosifier. The thickened clay-water system exhibits a relatively low mobility within the reservoir such that the tendency of the injected floodwater to finger is decreased. Another technique is disclosed in U.S. Pat. No. 3,279,537 to Kirk et al. In the Kirk et al. process a non-Newtonian fluid is employed as the flooding agent. This fluid exhibits shear-thinning characteristics such that the apparent viscosity of the fluid increases as the flow rate of the fluid through the reservoir decreases. Another process in which non-Newtonian fluids are used in the recovery of oil is disclosed in U.S. Pat. application Ser. No. 739,105 filed June 21, 1968, by Odeh, now U.S. Pat. No. 3,519,077. In this process shear-thinning and shear-thickening liquids are sequentially injected into the reservoir. The shear-thinning liquid may be injected until breakthrough occurs at the production system at which time injection of the shear-thickening liquid is initiated.

Various other techniques of improving the sweep efficiency of secondary recovery processes involve the selective formation of a plug within the more permeable zones of the reservoir. For example, U.S. Pat. application, Ser. No. 783,370 filed Dec. 12, 1968, by Abdo discloses a waterflooding process which employs a thickening agent which precipitates in the presence of divalent cations to form a plugging deposit within the reservoir. A chelating agent is employed in this process in order to cause the plugging agent to be selectively precipitated at zones of crossflow between strata of diverse permeabilities. Another technique is disclosed in U.S. Pat. No. 3,148,730 to Holbert. In this process a viscous slug is injected into the water zone of an oil reservoir in order to retard the flow of a subsequently injected driving fluid through the water zone.

SUMMARY OF THE INVENTION

In accordance with the present invention, there is provided a new and improved secondary oil recovery process wherein a time-dependent shear-thinning liquid is employed to enhance the sweep efficiency of the injected displacing fluid. The invention is carried out in a subterranean oil reservoir which is penetrated by spaced injection and production systems which define a recovery zone of the reservoir. In practicing the invention, at least a portion of the injected fluid comprises a time-dependent shear-thinning liquid. This liquid, because of its time dependency, retains a relatively low viscosity induced by the high shear rates attendant to injection even after it moves away from the injection system into regions of the reservoir where relatively low shear rates are encountered. Thereafter the liquid will undergo an increase in viscosity with time such that it functions to increase the sweep efficiency of the process.

In a preferred embodiment of the invention, fluid injection in the oil recovery process is suspended in order to allow for viscosity recovery of the time-dependent liquid and thereafter resumed. In yet another embodiment of the invention particularly applicable in reservoirs exhibiting a highly permeable "thief" zone, fluid injection in the process is suspended subsequent to breakthrough at the production system. By this technique the thief zone is blocked off to subsequently injected fluid as the time-dependent liquid undergoes viscosity recovery.

BRIEF DESCRIPTION OF THE DRAWINGS

FIG. 1 is a graph illustrating the viscosity-time relationships of a shear-thinning time-dependent liquid.

FIG. 2 is a vertical section of an oil reservoir taken between injection and production wells showing exemplary permeability variations within the reservoir.

FIGS. 3A, 3B, and 3C are diagrammatic illustrations showing the progressive flow of the injected time-dependent shear-thinning liquid through adjacent reservoir zones of dissimilar permeabilities.

DESCRIPTION OF SPECIFIC EMBODIMENTS

Liquid systems may be classified according to their characteristics of flow as Newtonian or non-Newtonian. For a Newtonian liquid, the shear stress is directly proportional to the shear rate under the flow conditions of interest. Thus, the viscosity (the ratio of shear stress to shear rate) of the liquid remains constant as the shear rate varies. For a non-Newtonian liquid, the shear stress is not directly proportional to shear rate. As a result, the viscosity of a non-Newtonian liquid changes as the shear rate changes. Non-Newtonian liquids may further be classified as "shear thinning" or "shear thickening." By the term "shear thinning" is meant that characteristic whereby a liquid exhibits a decrease in viscosity with an increase in shear rate. The term "shear thickening,"

on the other hand, denotes that characteristic whereby a liquid exhibits an increase in viscosity with an increase in shear rate. Many non-Newtonian liquids undergo a change in viscosity in response to a change in shear rate which, for all practical purposes, is instantaneous. Accordingly, these liquids, like the Newtonian liquids, are considered to be time independent. However, certain non-Newtonian liquid systems, such as may be formed by colloidal dispersions as described in more detail hereinafter, exhibit time-dependent viscosity characteristics. Thus, for a shear-thinning time-dependent liquid, when shear is first initiated at a given shear rate, the shear stress will have a given value. As the shear rate is maintained, the shear stress decreases with time to a lower value. Therefore, as the shear rate is maintained constant and the shear stress is reduced, the viscosity of the fluid is likewise reduced over the time interval. If the shearing force is then removed from the liquid, the viscosity will not immediately increase to its former level but will recover more or less gradually with the passage of time.

In the present invention, this phenomenon is utilized to advantage in the secondary recovery of oil by injecting as at least a part of the flooding fluid a shear-thinning time-dependent liquid. Because of the radial flow geometry attendant to the injection of a liquid into the formation, exceedingly high shear rates are encountered at the face of the well and in the reservoir immediately adjacent the injection well. Thereafter, as the injected fluid moves further out into the formation, the shear rate decreases rapidly. By employing a time-dependent shear-thinning liquid, the lower viscosity occasioned by the initial high shear rate is maintained as the fluid moves outwardly into the formation from the injection well. The viscosity of the liquid then will increase with time. Thus, a high rate of injectivity may be maintained in comparison to the injection of time-independent liquids, either Newtonian or non-Newtonian Further, as the viscosity of the injected time-dependent liquid increases at locations in the reservoir remote from the injection well, the sweep efficiency of the recovery process is enhanced.

The viscosity-time relationships of a typical shear-thinning time-dependent liquid are illustrated in FIG. 1. In FIG. 1 curve 34 is a plot of viscosity $\mu$ on the ordinate versus the logarithm of time T on the abscissa. The liquid is first sheared at time $T_0$ and the initial viscosity when shear is first imposed is $\mu_0$. Shearing of the liquid is continued until the liquid exhibits an equilibrium of $\mu_1$. At time $T_1$ the shearing force is removed and the liquid is allowed to recover some viscosity. At time $T_2$ the shearing force is reimposed and the viscosity of the liquid is found to be $\mu_2$. The aforementioned procedure is repeated except in this case a greater elapsed period after removing the shearing force is allowed before the shearing force is then reimposed at time $T_3$. The viscosity at this time has recovered to a value of $\mu_3$. This procedure is again repeated except a still further elapsed period is allowed and the shearing force is reimposed at time $I_4$ at which the viscosity has recovered a value $\mu_4$. By drawing a line 36 through the viscosity points $\mu_2$, $\mu_3$, $\mu_4$ and extrapolating to a viscosity of $\mu_0$, the recovery time of the liquid is found. This, of course, is the time $T_5$ minus $T_1$. Time-dependent shear-thinning liquids at the shear rates commonly encountered in injection into a subterranean formation, e.g., shear rates on the order of 0.1 to 1,000 sec.$^{-1}$, will exhibit a viscosity recovery time upon removal of the shearing force of at least 5 minutes or more. The viscosity recovery time, i.e., the time for complete viscosity recovery, may involve days or even months. A typical time-independent liquid will recover its viscosity upon removal of the shearing force almost instantaneously, normally so fast that the recovery time cannot be measured with conventional laboratory instruments.

Any suitable time-dependent liquid which is compatible with the reservoir and the oil therein may be used in carrying out the invention. Time-dependent liquids can be formed by the suspension of suitable colloids in polar solvents such as water, alcohols, and diols. A shear-thinning time-dependent liquid which may be used in carrying out the invention is a suspension of colloidal alumina in water. The particle sizes of the alumina are about 0.25 micron in length and 0.011 micron in diameter. This material is available from the DuPont Company under the trade name "Baymal." The colloid may be utilized in any desired concentration depending upon the viscosity and viscosity-time relationships desired. While the viscosity of the liquid increases with increasing concentration of the colloidal material, the relaxation time decreases with such increasing concentration. Thus, where a relatively long viscosity recovery time is desired in carrying out the invention, a low concentration of colloidal dispersant should be used. Where a shorter viscosity recovery time is desired, higher concentrations should be used. A time-dependent shear-thinning liquid useful for most purposes may be formed by 1 percent by weight concentration of colloidal alumina in water.

The present invention is carried out in a recovery zone of a subterranean oil-bearing reservoir. As will be understood by those skilled in the art, by the term "recovery zone," as used herein and in the appended claims, is meant that portion of a reservoir through which oil is displaced to the production system by the injected displacing medium. The injection and production systems each may comprise one or more wells extending from the surface of the earth into the subterranean oil reservoir and such wells may be located and spaced from one another in any desired pattern. For example, the so-called "line flood" pattern may be utilized, in which case the injection and production systems comprise rows of wells spaced from one another. In this type of pattern the recovery zone, as defined by the spaced rows of injection and production wells, generally will be that portion of the reservoir underlying the area between these spaced rows. Exemplary of other patterns which may be used is the so-called "circular flood" pattern in which the injection system comprises a central injection well and the production system comprises a plurality of production wells spaced about the injection well. Of course, the injection and production systems each may consist of only a single well in which case the recovery zone, as defined by the spaced injection and production wells, will be the portion of the reservoir underlying a generally elliptical area between these wells which is subject to the displacing action of the injected flooding medium. The above and other patterns are well known to those skilled in the art and for a more detailed description of such patterns reference is made to Uren, L. C., PETROLEUM PRODUCTION ENGINEERING—OIL FIELD EXPLOITATION, 2nd Ed., McGraw-Hill Book Company, Inc., New York and London, 1939, and more particularly to the section entitled "The Water Flooding Process," appearing at pages 444–459.

It also will be recognized that the invention may be carried out utilizing one or more dually completed injection-production wells of the type, for example, disclosed in U.S. Pat. No. 2,725,106 to Ralph Spearow. This arrangement sometimes may be utilized to advantage in a relatively thick oil reservoir in which it is desirable to displace the oil in the reservoir upwardly and recover such oil from the upper portion of the reservoir. In this instance, the injection system normally would comprise the lower completion interval of one or more dually completed wells of the type described in the aforementioned patent to Spearow and the production system would comprise the upper completion interval of one or more of such wells. In this case, or course, the recovery zone would be that portion of the reservoir subject to the displacing action of the flooding medium as it moves upwardly through the reservoir.

Turning now to FIG. 2 of the drawings, there is illustrated an oil reservoir 10 penetrated by spaced injection and production wells 12 and 14, respectively. While, for the purpose of simplicity in describing the invention, only one injection well and one production well are shown, it will be recognized that in practical applications of the invention a plurality of such wells may be, and in most cases will be, utilized. Thus, the wells 12 and 14 may each be considered to be located in rows of spaced injection and production wells, as in the line flood pattern described above. Also, the injection well 12 may be considered to be the central well in a circular flood pattern, e.g., a five-spot or nine-spot pattern, and the production well 14 one of the peripheral wells.

The reservoir 10 is bounded by layers 16 and 18 of relatively impermeable rock which overlie and underlie the reservoir. The reservoir is shown as being comprised of a number of fairly well defined zones 20, 21, and 22 which differ considerably in permeability in the direction of flow from the injection well to the production well. These zones may, of course, slope or have various curvatures, but typically they extend generally parallel to one another as shown. Some of the zones may be discontinuous. Thus, they may terminate or begin at various locations as viewed in the direction of flow. Also while only vertical permeability variation is shown in the reservoir 10, it will be recognized that the reservoir may exhibit horizontal permeability variation; that is, a horizontal section through the reservoir may reveal zones of diverse permeabilities.

Of the reservoir zones illustrated, those indicated by reference numerals 20 and 22 are considered to be zones of relatively low permeability with the zone 21 being a zone of relatively high permeability. Each of the reservoir zones 20, 21, and 22 contain oil which is desired to be displaced to the production well 14 by injecting a suitable fluid through the injection well 12. It will be recognized that upon injecting a displacing fluid through well 12, the fluid will flow preferentially through the zone 21 of high permeability with the result that relatively rapid displacement occurs therein as compared with the low permeability zones 20 and 22. Thus, the high permeability zone 21 will be "swept out" and the displacing fluid will break through at the production well 14 long before the injected displacing fluid is moved completely through the low permeability zones 20 and 22. Normally once breakthrough occurs at the production wells, the effectiveness of the secondary recovery process will be seriously restricted and additional oil can be recovered from the relatively low permeability zones 20 and 22 only at an increased expense.

In accordance with the present invention, the preferential flow of fluid through the high permeability zone 21 is decreased by the injection of a shear-thinning time-dependent liquid. As the time-dependent liquid is injected into the reservoir via well 12, it will selectively flow through the high permeability zone 21. That is, a greater quantity of fluid will flow into zone 21 than into the low permeability zones 20 and 22. Further, since the rate of flow (and thus the shear rate) of the injected fluid is greater through high permeability zone 21 than zones 20 and 22, the time-dependent liquid in zone 21 will advance deeper into the formation before its viscosity recovers to a given value.

The recovery process may be carried to completion by injection of the time-dependent shear-thinning liquid. However, it is preferred in carrying out the invention to inject only a limited amount of the time-dependent liquid during the early stages of the process and to follow this with a time-dependent fluid in order to displace the time-dependent liquid away from the well 12. The time-independent fluid may be a Newtonian liquid such as fresh water or brine and may contain additives such as thickeners and surfactants which are commonly employed in waterflooding processes. In addition, the time-independent liquid may be shear-thinning liquid such as an aqueous solution of partially hydrolyzed polyacrylamide. However, if a thickened Newtonian or non-Newtonian liquid is employed in this step, it should exhibit a maximum viscosity under the conditions of flow within the reservoir which is less than the maximum viscosity of the time-dependent liquid. By displacing the time-dependent liquid away from the injection well to a more remote location in the reservoir where it recovers its viscosity with time, the flow of subsequently injected fluid is ultimately diverted from high permeability zones into those of relatively low permeability in order to further enhance the sweep efficiency of the process.

Turning now to FIGS. 3A, 3B, and 3C, there is shown an idealized reservoir model which illustrates the sequential locations of the shear-thinning time-dependent liquid injected in accordance with the present invention. Fluid movement through the model is shown as being from left to right. The reservoir model is depicted as having a high permeability zone 24 and a low permeability zone 25. By way of example, zones 24 and 25 may be considered as corresponding generally to the zones 21 and 20, respectively, shown in FIG. 1.

In the situation depicted in FIG. 3A, the injection of the shear-thinning time-dependent liquid is in progress, with reference characters 26 and 26a representing, respectively, the slugs of this liquid in zones 24 and 25. Since the liquid is shear thinning, the injectivity ratio of zone 24 to zone 25 will be significantly greater than the ratio of the permeability of zone 24 to the permeability of zone 25. This, of course, results in the disparity between the sizes of slugs 26 and 26a being greater than would be the case with a Newtonian liquid. As the slugs 26 and 26a move outwardly into the reservoir away from the injection well, the viscosities of the slugs increase both with time and with decreasing shear rate. This increase in viscosity is indicated in ordinate by broken line 28 in slug 26 and broken line 28a in slug 26a. Thus, as can be seen, the front portion of each slug will be at a somewhat higher viscosity than the portion of the slug next adjacent the injection well which is at a low viscosity due to the high shear rates attendant to injection into the reservoir.

After injection of the desired amount of time-dependent shear-thinning liquid, a time-independent liquid is injected. The slugs of time-independent liquid are indicated in FIG. 3B by reference characters 30 and 30a in zones 24 and 25, respectively. The viscosity of the previously injected time-dependent liquid has increased even further by virtue of the greater elapsed time as indicated by broken lines 28 and 28a.

FIG. 3C shows the location of the liquid slugs upon continued injection of the time-independent liquid. As illustrated, the viscosity of the time-dependent liquid has increased further with elapsed time and offers an even greater resistance to flow through the formation. As a result, the subsequently injected time-independent liquid in slug 30 tends to crossflow from zone 24 into low permeability zone 25. This increases the displacement of oil within zone 25 and results in an overall increase in the sweep efficiency of the process.

In a further embodiment of the invention, fluid injection is temporarily halted in order to allow for a period of zero shear rate in which the time-dependent fluid can recover to a viscosity at or near that existing before it was initially sheared. The period of this suspension will depend upon the viscosity recovery rate of the time-dependent liquid as described above and may vary from a period of hours up to days or even months. Preferably, fluid injection is suspended after introducing a suitable amount of time-independent liquid in order to displace the time-dependent liquid away from the injection well. This will avoid formation of a highly viscous slug immediately adjacent the injection well with the attendant hazard of harming the injectivity of this injection well.

If desired, a plurality of slugs of the time-dependent liquid, each separated by a time-independent liquid, may be injected. This is particularly beneficial where the reservoir exhibits a number of high permeability zones. Thus, the first slug of time-dependent liquid will preferentially enter the most permeable zone with relatively smaller amounts entering zones of lower permeabilities after injection of a suitable amount of time-independent liquid. Fluid injection is then suspended in order to allow the first injected slug to recover to a desired viscosity level. Thereafter, the next injected slug of time-dependent liquid will tend to be restricted in its entry into the zone of highest permeability and will preferentially flow into zones which are of somewhat lower permeability although higher than other zones within the reservoir. Fluid injection may again be suspended and the process repeated with additional slugs of time-dependent shear-thinning liquid as necessary.

In a further embodiment of the invention, fluid injection is temporarily suspended after breakthrough occurs at the production system. As will be understood by those skilled in the art, by the term "breakthrough" is meant the appearance of an injected fluid at one or more of the wells comprising the production system. Such breakthrough normally can be recognized by a fairly abrupt increase in the ratio of injected fluid to oil at a production well. However, if desired, a suitable tracer such as a radioactive material may be incorporated in the initial portion of the time-dependent liquid and the production effluent from the production wells then monitored with regard to this tracer.

This embodiment of the invention is particularly useful in those reservoirs which exhibit a thin channel or zone of such extremely high permeability that substantially all of the injected fluid will channel through this zone. Such zones, commonly termed "thief" zones, may be due to extensive fractures within the reservoir. In any case, by injecting the time-dependent shear-thinning liquid into the reservoir until breakthrough occurs and then suspending the fluid injection, the major portion of the thief zone can be filled with material of relatively high viscosity. This will tend to block the thief zone to subsequently injected fluid and thus prevent channeling through the zone. If it is desired to avoid the presence of the time-dependent liquid immediately adjacent a production well, the time-dependent liquid can be preceded by a time-independent liquid such as oilfield brine which contains a tracer. This will avoid the flow of the time-dependent liquid into the production well and the attendant possibility of damage to the production well. Upon the first appearance of the tracer at the production well or at a desired estimated time when the thief zone is thought to be substantially full, the production well is shut in. Injection is switched from the time-dependent liquid to a time-independent liquid. The injection of the time-independent liquid is continued for a time sufficient to displace the time-dependent liquid an adequate distance from the injection well. Thereafter, injection may be suspended for a time sufficient to allow the time-dependent liquid to recover to the desired viscosity.

The amount of time-dependent shear-thinning liquid injected will depend upon the reservoir characteristics such as the relative volumes of the low and high permeability zones within the recovery zone. It is generally desirable to introduce as little as possible of the time-dependent shear-thinning liquid into the less permeable zones of the reservoir. Consequently, if the volume of the more permeable zones is small in comparison to the volume of the low permeability zones, the amount of time-dependent liquid injected will be much smaller than in the case where the volume of the high permeability zones is high. Usually it will be desirable to inject the time-dependent shear-thinning liquid in an amount within the range of 0.5 percent to 25 percent of the pore volume of the recovery zone. The amount will be near the lower end of this range where only small streaks of high permeability strata are present and will range upward as the volume of high permeability zones increases.

What is claimed is:

1. In the recovery of oil from a subterranean oil reservoir penetrated by spaced injection and production systems defining a recovery zone of said reservoir by a method involving the injection of fluid into said reservoir via said injection system to displace oil toward said production system and the recovery of oil therefrom, the improvement comprising injecting into said reservoir as at least a portion of said fluid a viscosity time-dependent shear-thinning liquid which exhibits a viscosity recovery time at shear rates within the range of 0.1 to 1,000 sec.$^{-1}$ of at least 5 minutes.

2. The method of claim 1 wherein fluid injection is suspended in order to allow viscosity recovery of said viscosity time-dependent liquid and thereafter resuming fluid injection.

3. The method of claim 2 wherein fluid injection is suspended subsequent to breakthrough at said production system.

4. The method of claim 2 wherein additional viscosity time-dependent shear-thinning liquid is injected subsequent to said suspension of fluid injection.

5. The method of claim 1 wherein a plurality of slugs of viscosity time-dependent shear-thinning liquid are injected separated by a time-independent liquid.

6. The method of claim 1 wherein said viscosity shear-thinning liquid is injected in an amount within the range of 0.5 to 25 percent of the pore volume of said recovery zone.

* * * * *

UNITED STATES PATENT OFFICE
CERTIFICATE OF CORRECTION

Patent No. 3,637,014                     Dated January 25, 1972

Inventor(s) Lloyd G. Jones

It is certified that error appears in the above-identified patent and that said Letters Patent are hereby corrected as shown below:

Column 1, line 25, after "flooding" insert --medium--;
          line 27, "oil" should be --oil- --.
Column 3, line 56, "$I_4$" should be --$T_4$--;
          line 64, "The" should be --In fact, the--.
Column 4, line 63, "or course" should be --of course--.
Column 5, line 56, "time-dependent" should be
                   --time-independent--.
Column 8, line 38, after "viscosity" insert --time-dependent--.

Signed and sealed this 22nd day of August 1972.

(SEAL)
Attest:

EDWARD M. FLETCHER, JR.                ROBERT GOTTSCHALK
Attesting Officer                      Commissioner of Patents